W. D. PARSONS, DEC'D.
E. L. MARVIN, EXECUTOR.
DIRECT DRIVE TRANSMISSION.
APPLICATION FILED JAN. 16, 1914.
1,136,709.
Patented Apr. 20, 1915.
2 SHEETS—SHEET 2.
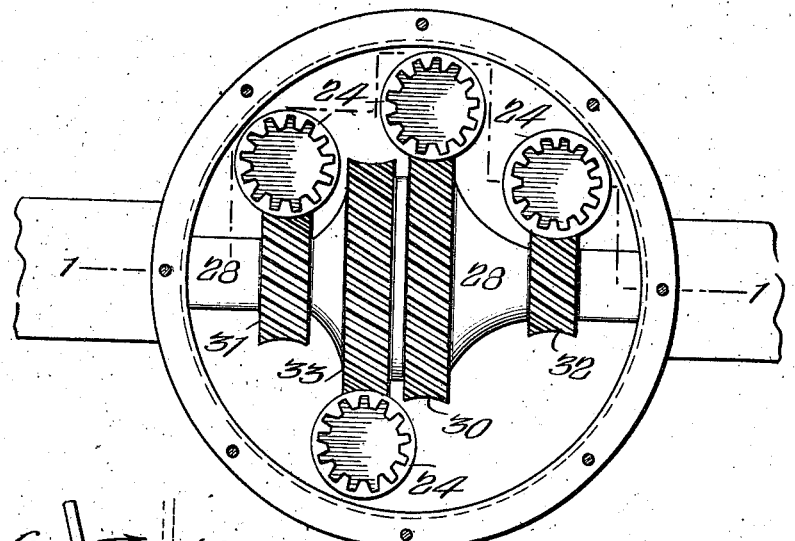
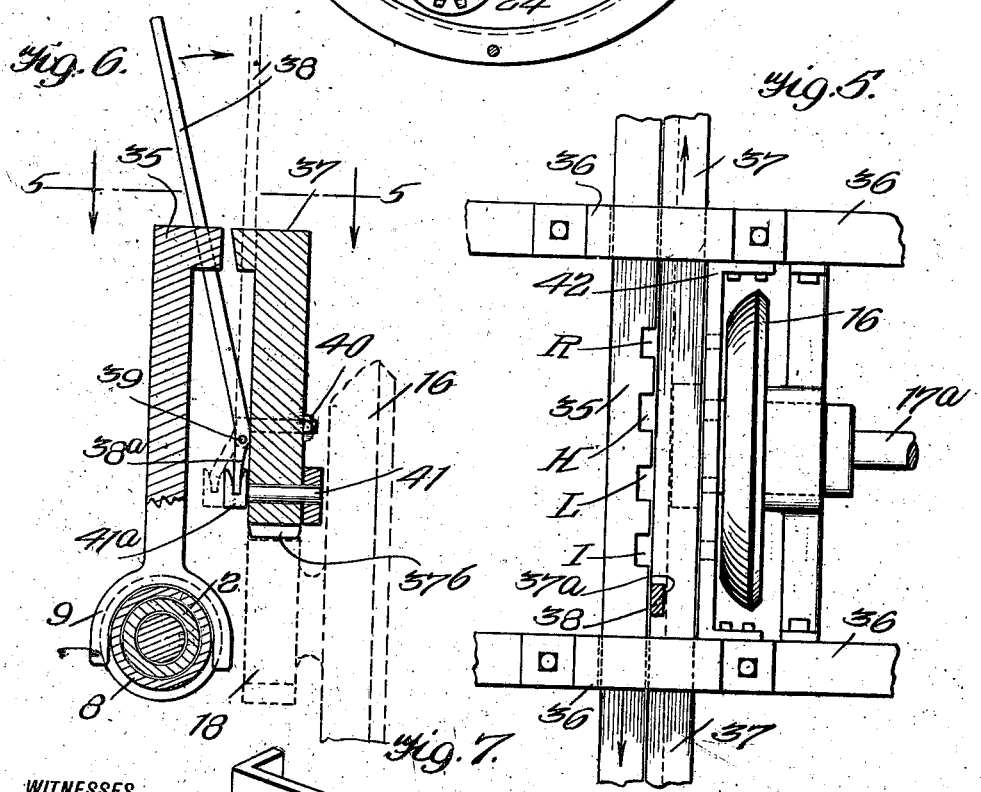
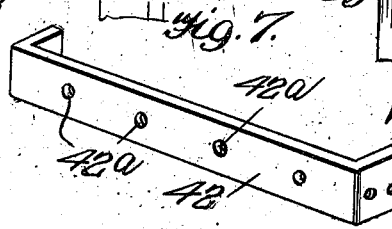
WITNESSES
E. M. Callaghan
L. A. Stanley
INVENTOR
WILLIAM D. PARSONS
BY Munn & Co.
ATTORNEYS

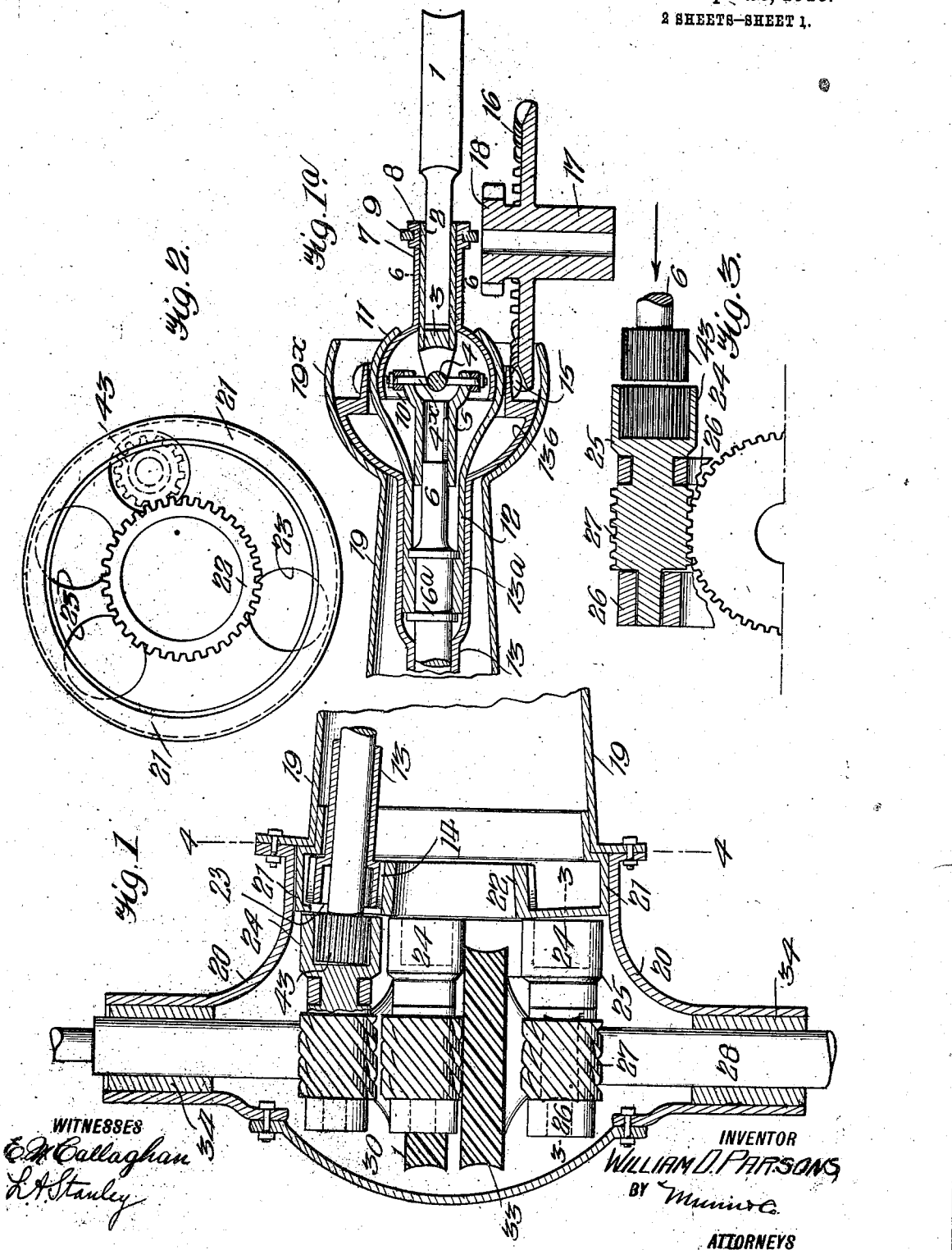

UNITED STATES PATENT OFFICE.

WILLIAM D. PARSONS, OF JOLIET, MONTANA; E. L. MARVIN, OF JOLIET, MONTANA, EXECUTOR OF SAID PARSONS, DECEASED.

DIRECT-DRIVE TRANSMISSION.

1,136,709. Specification of Letters Patent. Patented Apr. 20, 1915.

Application filed January 16, 1914. Serial No. 812,409.

*To all whom it may concern:*

Be it known that I, WILLIAM D. PARSONS, a citizen of the United States, and a resident of Joliet, in the county of Carbon and State of Montana, have made certain new and useful Improvements in Direct-Drive Transmission, of which the following is a specification.

My invention relates to direct drive transmission mechanism, and it consists in the combinations, constructions and arrangements herein described and claimed.

An object of my invention is to provide a device which is particularly adapted for use with automobiles or other motor driven vehicles in which final drives of different speeds are provided instead of the ordinary single final drive.

A further object of my invention is to provide means for shifting the drive shaft of the motor or engine from one position to another in order to engage and operate the various final drives.

A further object of my invention is to provide a mechanism of the type described which will do away with the complicated transmission mechanism and the gear shifting devices therefor and the consequent noise occasioned thereby, in speed changing mechanism of the ordinary type.

Other objects and advantages will appear in the following specification and the novel features of the device will be particularly pointed out in the appended claims.

My invention is illustrated in the accompanying drawings forming part of this application in which—

Figure 1 is a substantially horizontal section of a portion of my improved transmission mechanism near the rear axle, Fig. 1ª is a substantially horizontal section of a portion of the transmission mechanism showing its connection with the engine shaft, Fig. 2 is a face view of a portion of the transmission mechanism shown in Fig. 1, Fig. 3 is a section along the line 3—3 of Fig. 1, a portion of the drive shaft being shown in relation thereto, Fig. 4 is a section along the line 4—4 of Fig. 1, Fig. 5 is a section along the line 5—5 of Fig. 6, Fig. 6 is a vertical section through a portion of the transmission mechanism substantially along the line 6—6 of Fig. 1ª, and Fig. 7 is a perspective view showing a portion of the means for locking the operating lever in position.

In carrying out my invention I make use of any suitable engine having a drive shaft 1 to which is secured a sleeve 2 having a forked end 3, through which a pivot pin 4 extends. The pivot pin 4 is connected with a pivot pin 4ˣ extending at right angles thereto being journaled in the ends of a sleeve 5 which is keyed to a drive shaft 6. The sleeve 2 is surrounded by a second sleeve 7, which is provided with a grooved collar 8 partly encircled by a yoke 9. The sleeve 7 terminates in a hemispherical head 10 which is engaged by the hemispherical end 11 of an inner casing 12. The members 10 and 11 are curved on an arc whose center lies in the axis of the pivotal member 4. The inner casing 12 engages collars 6ª on the shaft 6, so that when the casing 12 is moved the shaft 6 is moved with it.

Surrounding the drive shaft 6 is a tubular shaft 13 which carries at one end an integral gear 14. The opposite end of the tubular shaft 13 is extended at 13ª to inclose the inner casing member 12 and again at 13ᵇ it is fashioned in a hemispherical shell having teeth 15 arranged to engage a gear 16 which is mounted on a hub 17. The latter also bears an integral gear 18. An outer protective casing 19 has a portion 19ˣ which is curved to correspond with the curvature of the portion 13ᵇ and diverges in the manner shown in Figs. 1 and 1ª. The casing 19 is secured to the casing 20 which incloses the parts which coöperate with the drive shaft 6 and the tubular shaft 13.

Carried partly by the casing member 20 and partly by the casing member 19 is a stationary circular-shaped guide member 21 which is provided at its center with an integral gear 22. The member 21 is provided with openings 23 which are arranged to register with internally fluted sockets 24 at the ends of stub shafts 25 which are journaled in bearings 26 (see Fig. 3) and each of which bears a worm 27. As will be seen from Fig. 2 there are four of these openings and there are consequently four of the stub shafts 25. As will be seen in Fig. 4 three of the sockets 24 are disposed on one side of the axle 28, the remaining socket being disposed on the opposite side. One of the worms is arranged to engage a large worm wheel 30 on the shaft 28 to give a low forward drive, another engages a worm 31 of smaller diameter to give an intermediate drive, and a third engages the wheel 32 to give a high speed forward, while the fourth worm engages the large gear or worm wheel 33 to give a reverse drive at low speed.

The shaft 28 extends through bearings 34 at the ends of the casing 20. Referring now to Fig. 6 it will be seen that the yoke 9 is connected with a slidable bar 35, which is mounted to move in guides 36. The bar 35 is provided with notches which are indicated at R, H, L and I. These notches correspond to reverse, high speed, low speed and intermediate speed respectively. Disposed parallel with and adjacent to the bar 35 is another slidable bar 37. This is provided with a single notch 37ª. Upon the bar 37 is pivotally mounted an operating lever 38, which has its fulcrum at 39. The fulcrum 39 is itself carried by the depending end of a pivot bolt 40 which passes through the bar 37, as shown in Fig. 6. The lever 38 is provided with an extension 38ª which is disposed at an angle to the main body portion, as shown in Fig. 6, and which extends into the notched head 41ª of a slidable locking pin 41. The latter is arranged to extend into openings 42ª in a locking bar 42 whose ends are secured between the frame members 36.

The bar 37 has teeth 37ᵇ arranged to mesh with the gear 18 which is mounted on a shaft 17ª, the latter bearing also the gear 16.

From the foregoing description of the various parts of the device the operation thereof may be readily understood.

The rotation of the drive shaft 1 causes the rotation of the drive shaft 6 through the medium of the universal joint. Normally the operating lever 38 is in the notch 37ª in the slidable bar 37 in which case the locking pin 41 is withdrawn from the locking bar 42, since the lever is then in the dotted line position shown in Fig. 6. If now, it is desired to shift the lever so as to throw the drive shaft 6 into position to operate the vehicle at low speed the lever is forced in the direction shown by the arrow in Fig. 5 until it is opposite the notch L. Now it will be observed that when the lever 38 is in the notch 37ª it does not act as a lever, but as a rigid handle, since it is held at two points, to wit: the pivot bolt 40 and the walls of the notch 37ª. Therefore the bar 37 will move in the direction in which the lever is forced.

The movement of the bar 37, which, as stated before, is provided with teeth 37ᵇ, thereby constituting a rack, causes the revolution of the gear 18 and the gear 16. The turning of the latter gear causes the revolution of the tubular shaft 13, and this will cause the gear 14 to travel around the gear 22 until it comes directly opposite an opening 23 which registers with the socket 24 carried by the worm that engages the large gear 30 on the axle of the vehicle. The operating lever is now forced into the slot L, and this movement forces the locking pin 41 into the locking bar 42, thereby locking the parts in position. The lever 38 is now forced in the opposite direction, i. e., in the direction shown by the arrow in Fig. 5. The pivot bolt 40 now becomes the fulcrum of the lever and therefore the slidable bar 35 is moved, and with it the yoke 9, the sleeve 7, casing member 12, and the shaft 6 bodily, the upper end of the shaft sliding in the sleeve member 5 to which it is keyed. A clutch member 43 is carried by the end of the shaft 6 and enters the socket 24. The rotation of the shaft 1 will now cause the driving of the vehicle at low speed through the medium of the shaft 6, clutch members 43 and 24, worm 27, worm wheel 30 and axle 28.

In changing from one speed to another it is only necessary to reverse this operation. Thus, the lever 38 is moved so as to cause the bar 35 to move in a direction opposite to that shown in Fig. 5, thus withdrawing the clutch member 43 from engagement with its clutch member 24. The lever is now pushed over into the notch 37ª, thus withdrawing the locking pin and permitting the movement of the rack bar 37 to any of the other notches. It will be observed that when the lever 38 is in the notch 37ª the clutch member 43 must be withdrawn from the clutch member 24 and hence it follows that one must always go to neutral when shifting from one speed to the other.

I claim:

1. In a direct drive transmission mechanism, an engine shaft, an axle, a plurality of worm wheels of different size carried by said axle, a plurality of rotatable stub shafts, the axis of each of said stub shafts being at right angles to the axle and said axes being arranged in a circle, a socket carried by each of said stub shafts, a drive shaft having a connection for universal movement with respect to said engine shaft, a clutch member carried by said drive shaft, said drive shaft being mounted so as to bring its clutch member into registration with any of said sockets, means for moving said drive shaft bodily to cause its clutch member to enter the registering socket, said last named means comprising a tubular shaft surrounding said drive shaft, a gear carried by said tubular shaft, and a cylindrical stationary guide member having a centrally disposed gear arranged to be engaged by the gear on said tubular shaft, and means for rotating said tubular shaft.

2. In a direct drive transmission mechanism, an engine shaft, an axle, a plurality of worm wheels of different size carried by said axle, a plurality of rotatable stub shafts, the axis of each of said stub shafts being at right angles to the axle and said axes being arranged in a circle, a socket carried by each of said stub shafts, a drive shaft having a connection for universal movement with respect to said engine shaft, a clutch member carried by said drive shaft, said drive shaft being mounted so as to bring its clutch member into registration with any of said sockets, means for moving said drive shaft bodily to cause its clutch member to enter the registering socket, said last named means comprising a tubular shaft surrounding said drive shaft, a gear carried by said tubular shaft, and a cylindrical stationary guide member having a centrally disposed gear arranged to be engaged by the gear on said tubular shaft, means for rotating said tubular shaft, and additional means for moving said drive shaft longitudinally.

3. In a transmission mechanism, an engine shaft, a drive shaft having a universal connection with said engine shaft, a tubular shaft surrounding said drive shaft, means for rotating said tubular shaft, a gear carried by said tubular shaft, a cylindrical stationary guide member having a centrally disposed gear arranged to be engaged by the gear on the tubular shaft, said guide member having openings, an axle, driving means for said axle including sockets arranged to register with the openings in said guide member, and means for moving said drive shaft longitudinally to project its gear through any of said openings into the registering socket.

4. In a transmission mechanism, an engine shaft, a drive shaft having a universal connection with said engine shaft, a tubular shaft surrounding said drive shaft, means for rotating said tubular shaft, a gear carried by said tubular shaft, a cylindrical stationary guide member having a centrally disposed gear arranged to be engaged by the gear on the tubular shaft, said guide member having openings, an axle, driving means for said axle including sockets arranged to register with the openings in said guide member, means for moving said drive shaft longitudinally to project its gear through any of said openings into the registering socket, said last named means comprising a sleeve slidably disposed on said engine shaft, a yoke for operating said sleeve, an inner casing surrounding said drive shaft to permit the rotation of the latter and having means to engage said drive shaft to effect a longitudinal movement of the shaft, and connections between the sleeve and the inner casing.

5. The combination of a slidable rack bar provided with a notch, a lever pivotally connected with said rack bar and arranged to enter the notch, a slidable bar disposed adjacent to said slidable rack bar and being provided with a plurality of notches arranged to receive said lever, a yoke carried by said last named slidable bar, a transmission mechanism arranged to be actuated by said yoke, a pinion meshing with the rack bar, means actuated by the yoke and pinion for controlling the transmission mechanism, and means for locking said rack bar in position when the lever is in one of the notches on the bar carrying the yoke.

6. The combination of a slidable rack bar provided with a notch, a lever pivotally connected with said rack bar and arranged to enter the notch, a slidable bar disposed adjacent to said slidable rack bar and being provided with a plurality of notches arranged to receive said lever, a yoke carried by said last named slidable bar, a transmission mechanism arranged to be actuated by said yoke, a pinion meshing with the rack bar, means actuated by the yoke and pinion for controlling the transmission mechanism, means for locking said rack bar in position when the lever is in one of the notches on the bar carrying the yoke, said locking means comprising a locking bar having perforations corresponding to the notches on said bar carrying the yoke, and a pin on the lever and slidably carried by said rack bar and adapted to enter the perforations in said locking bar.

WILLIAM D. PARSONS.

Witnesses:
G. A. LOVERING,
R. L. SIMPSON.